USO05756028A

United States Patent [19]

Liao

[11] Patent Number: 5,756,028
[45] Date of Patent: May 26, 1998

[54] METHOD OF MANUFACTURING RESIN ARTICLES HAVING A NATURALLY FORMED PATTERN THEREON

[76] Inventor: Ju-Liang Liao, No. 168, Nan Hai 2nd Street, Jen An Village, Chian Hsiang, Hua Lien Hsien, Taiwan

[21] Appl. No.: 613,322

[22] Filed: Mar. 11, 1996

Related U.S. Application Data

[63] Continuation-in-part of Ser. No. 294,576, Aug. 23, 1994, abandoned.

[51] Int. Cl.$^6$ ................................................ B29C 45/00
[52] U.S. Cl. ........................ 264/139; 264/162; 264/275; 264/279; 425/89
[58] Field of Search ....................... 264/316, 338, 264/271.1, 300, 162, 139, 279, 275; 249/112; 425/89

[56] References Cited

U.S. PATENT DOCUMENTS

| | | | |
|---|---|---|---|
| 1,665,355 | 4/1928 | Gustafson | 264/338 |
| 2,673,371 | 3/1954 | Uhlig | 264/316 |
| 2,811,744 | 11/1957 | Baldanza | 264/132 |
| 3,074,112 | 1/1963 | Borrow | 264/275 |
| 3,607,488 | 9/1971 | Yordan | 156/57 |
| 5,560,883 | 10/1996 | Lane et al. | 264/275 |

OTHER PUBLICATIONS

"Preserved in Plastic" Scientific America; p. 217, Oct. 1939.

*Primary Examiner*—Jan H. Silbaugh
*Assistant Examiner*—Edmund H. Lee
*Attorney, Agent, or Firm*—Morton J. Rosenberg; David I. Klein; Jun Y. Lee

[57] ABSTRACT

A method of manufacturing resin articles with naturally formed patterns is provided. The method uses organic matter, such as portions of a fern like the "*Sphaeropteris lepifera*", and a resin, to be molded together and then machined into a desired shape. The inner surfaces of the upper mold section and the lower mold section are covered by aluminum foil sheets and enclose a portion of a fern, such as the "*Sphaeropteris lepifera*" therein. A resin is injected into the mold through an opening in one foil sheet and the mold is heated to an appropriate temperature. Subsequently, the mold is cooled by room temperature air and dried by a drying machine. The resin is removed from the mold and machined into a particular shape in accordance with a predetermined design. The shaped molded resin is smoothed by grinding or filling in uneven portions with resin. After smoothing, the molded resin is polished to provide a naturally-formed pattern on the surface thereof.

7 Claims, 4 Drawing Sheets

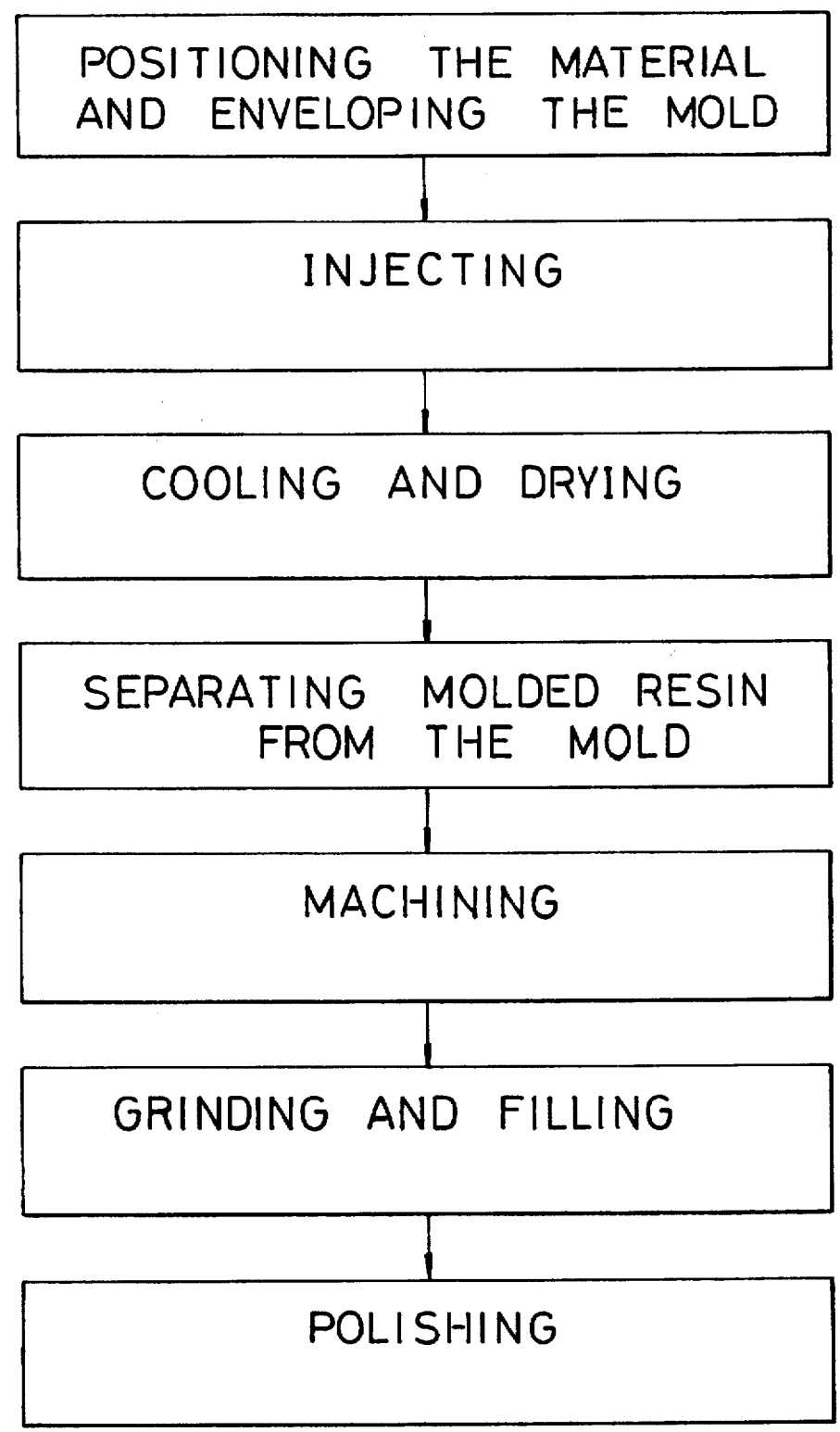
F I G. 1

METHOD OF MANUFACTURING RESIN ARTICLES HAVING A NATURALLY FORMED PATTERN THEREON

CROSS-REFERENCE TO RELATED PATENT DOCUMENTS

This Patent Application is a Continuation-in-Part of Ser. No. 08/294,576, filed 23 Aug. 1994, and entitled "MANUFACTURING METHOD OF RESIN PRODUCTS HAVING NATURAL DESIGNS," now abandoned.

BACKGROUND OF THE INVENTION

1. Field of the Invention

The present invention provides a manufacturing method by which a resin article with a naturally-formed pattern can be made to have a special aesthetic effect without painting, printing or glazing.

2. Prior Art

Prior art products made of a melamine resin have heat enduring characteristics. Melamine resin is often used for manufacturing decorative containers and utilitarian food containers, and such containers are more resistant to breakage than china. However, the products manufactured from such melamine resin can only be molded in a single color, and can only be provided with an aesthetically pleasing design by adding painting or printing processing steps.

SUMMARY OF THE INVENTION

The present invention relates to a method of manufacturing resin articles with a naturally formed pattern which method produces articles from both resin material and a type of fern whose name translates from Chinese as "Pen Cylinder Tree", and has the Latin name "*Sphaeropteris lepifera*". Particular parts of the "*Sphaeropteris lepifera*" have been selected for use with the inventive method. In particular, the stem has a hollow cylindrical shape, and the roots are shaped as a rectangular block shaped matrix, and both have been used to practice the instant method.

In accordance with the inventive method, the resin material is molded in a two-piece mold with a stem or block of roots disposed therein. The molding is accomplished by injecting a liquid resin into the mold and heating the resin to a predetermined temperature, the temperature necessary to make the resin material completely permeate the organic material and promote bonding between the resin and the organic material. Subsequently the mold with the resin is cooled in room temperature air and dried with a drying machine. Prior to placing any material in the mold, the two mold parts are lined with aluminum foil to make removal of the molded resin from the mold easier. The cured resin is taken out of the mold and machined to shape it. The uneven surfaces of the molded resin are smoothed by grinding or filling the uneven surfaces with resin. Lastly, the molded resin is polished to provide the finished resin article having a naturally formed pattern therein.

The cylindrical stem of said "*Sphaeropteris lepifera*" is used for making the resin articles whose shape is substantially cylindrical, such as a vase. While the block of root material, which usually have dark brown colors, is used for making resin articles having a contour with a relatively small height dimension, such as a round plate, like a dining type dish.

The resin article, after being polished, has a naturally-formed pattern on the surface, produced without painting or glazing. Both the pattern and the resin contrast in an aesthetically pleasing fashion. Furthermore, the resin material can be pre-mixed with various colors, such that the finished resin articles will become more colorful.

BRIEF DESCRIPTION OF THE DRAWINGS

The present invention will be better understood by reference to the accompanying drawings, wherein:

FIG. 1 is a flow chart of the method of manufacturing resin articles with a naturally formed pattern of the present invention;

DESCRIPTION OF THE PREFERRED EMBODIMENTS

Figure 2:
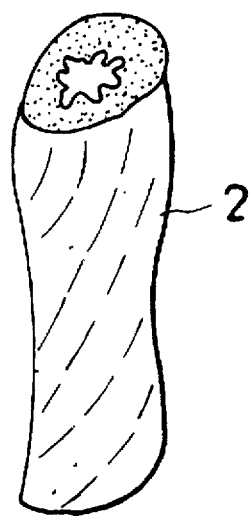
FIG. 2 is a perspective view of a stem of a "*Sphaeropteris lepifera*" used in an embodiment of the present invention.
Figure 3:
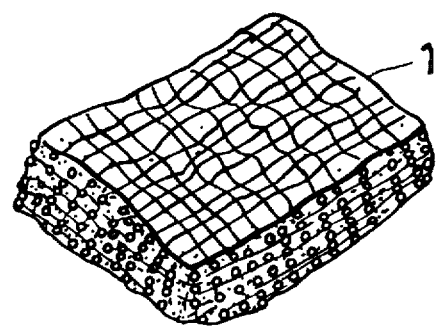
FIG. 3 is a perspective view of a block of roots of a "*Sphaeropteris lepifera*" used in another embodiment of the present invention.

A method of manufacturing resin articles with a naturally formed pattern is provided. The method, as shown in FIG. 1, combines both a resin material and a kind of fern known as "Pen Cylinder Tree" in Chinese, and identified as "*Sphaeropteris lepifera*" in Latin. The articles made accordingly having a naturally formed pattern. Parts of the "*Sphaeropteris lepifera*" have a special natural shape, as shown in FIGS. 2 and 3. In particular, parts such as the stem 2 have a hollow longitudinally extended cylindrical shape, while the roots 1 form a mesh having parallelepiped contour.

Figure 5:
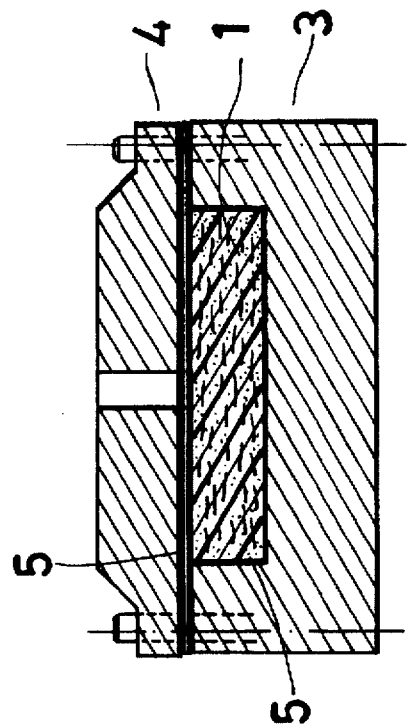
FIG. 5 is a cross-sectional view showing a mold enclosing aluminum foil sheets and a block of organic matter therein.
Figure 4:
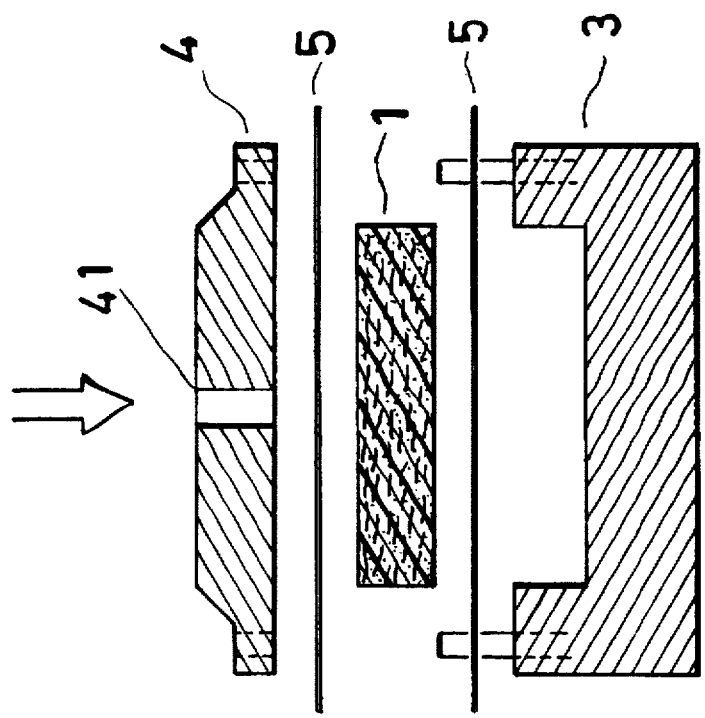
FIG. 4 is an exploded cross-sectional view showing an upper mold section, a block of roots of an organic material, aluminum foil sheets and a lower mold section.

Referring additionally to FIGS. 4 and 5, there is shown a mold having a lower mold section 3 and an upper mold section 4, having an internal contour shaped according to a predetermined design. An air compressor, not shown, is used to exert pressure on the resin for injection into the mold.

Aluminum foil sheets 5 are placed on the inner surfaces of both the lower mold section 3 and the upper mold section 4. Next, organic matter, such as parts of a fern, are placed in the cavity of the lower mold section 3. In particular, the roots 1, as shown in FIG. 2, of the fern "*Sphaeropteris lepifera*" are placed into the cavity of the lower mold section 3. The lower mold section 3 is covered by the upper mold 4. The upper mold section is secured to the lower mold section and a liquid resin is injected into the mold sections 3, 4 through the opening 41 and a corresponding opening formed in the aluminum foil sheet 5 disposed on the inner surface of the upper mold section 4. Next, the liquid resin is heated to a predetermined temperature, as required for the particular resin used, while it is under pressure. The liquid resin permeates the organic material. The resin containing mold is naturally cooled by exposure to air at room temperature, and dried with a drying machine. By that process, the resin is bonded with the fern portions 1 or 2. Subsequently, the upper mold section 4 is removed and the molded resin articles is taken out.

The first stage of finishing the article is machining the molded resin form to a desired final shape. Next, the molded resin shaped form is smoothed, either by grinding or filling in the uneven surfaces thereof with resin. Lastly, the resin article is polished to provide a finished surface with a natural appearing pattern.

The aluminum foil sheets 5 are used to facilitate removal of the resin article from the mold sections 3, 4. The injection pressure of the resin and the subsequent heating step facilitates the permeation of the resin into the fern portion 1 or 2 and the bonding therebetween. The heated and pressurized resin fills every interstice of the block of roots 1 or stem 2 of the "*Sphaeropteris lepifera*" or other fern used. A lathe may be used to machine the molded resin form into the substantial shape of the article's design. After the smoothing step, polishing agents are used to polish the article's surface.

Figure 6:
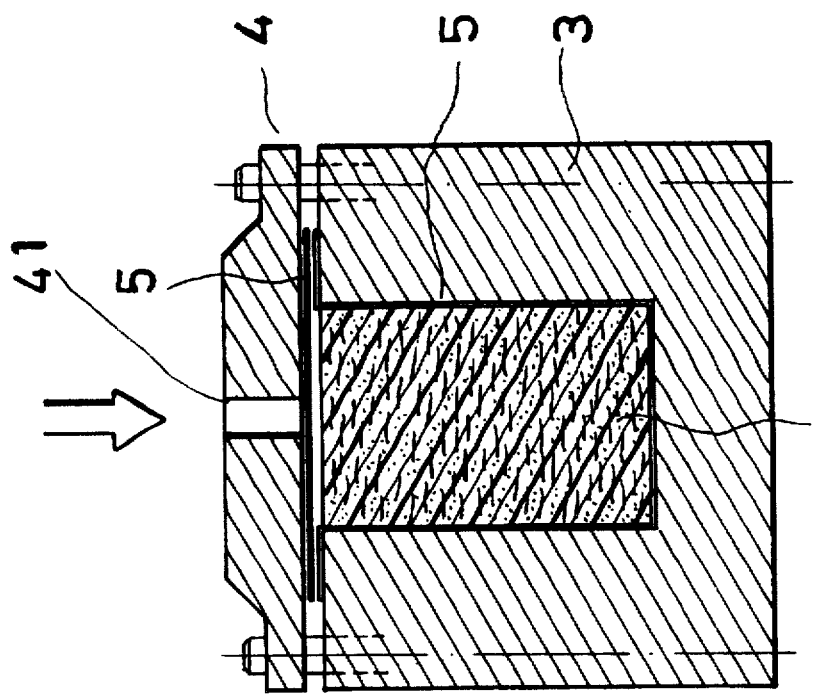
FIG. 6 is a cross-sectional view showing an upper mold section and a lower mold section housing cylindrically shaped organic material from a stem portion of a "*Sphaeropteris lepifera*" and, FIG. 7 is a cross-sectional view showing an upper mold section and lower mold section housing a hollow cylindrical organic material from a stem of a "*Sphaeropteris lepifera*" with an auxiliary molding tool positioned therein.

In the embodiment of FIG. 6, the resin article is made with a naturally formed pattern, using the cylindrical stem 2 of a "*Sphaeropteris lepifera*" fern, shown in FIG. 2. The stem 2 is used for making an elongated substantially cylindrical resin article such as a vase. In the embodiment of FIGS. 4 and 5, the resin article is made with a naturally formed pattern using the block of roots 1, shown in FIG. 3, which usually have a dark brown color. That portion of the fern may be used for making the resin articles that have a substantially horizontally extended shape, such as a round plate or a dining dish.

Figure 7:
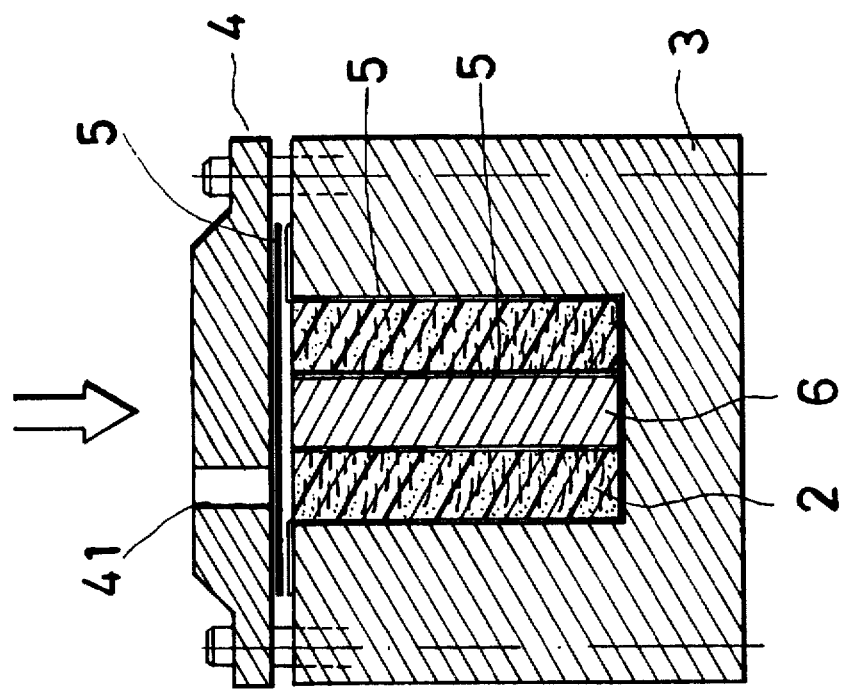

In another embodiment, shown in FIG. 7, an auxiliary molding tool 6 is provided and covered with another aluminum foil sheet 5. The foil covered tool 6 is inserted into the hollow portion of the cylindrical stem 2 of the "*Sphaeropteris lepifera*", or other fern, to prevent the resin from filling that space, allowing the finished article to be hollow without the need to machine a bore therein.

The resin article, after being polished, has a naturally-formed pattern on the surface which is very beautiful and which pattern contrasts with the resin in an aesthetically pleasing manner. Furthermore, the resin material can be pre-mixed with various colors, such that the finished resin articles will become more colorful.

While the preferred embodiments of the invention have been described above, it will be recognized and understood that various modifications may be made therein and the appended claims are intended to cover all such modifications which may fall within the spirit and scope of the invention.

What is claimed is:

1. A method of manufacturing a molded resin article having a naturally formed surface pattern, comprising the steps of:

a. providing a first mold section, said first mold section defining an open cavity;

b. overlaying said first mold section with a first aluminum foil sheet;

c. providing a second mold section;

d. overlaying said second mold section with a second aluminum foil sheet;

e. providing in said open cavity a portion of a fern;

f. securing said second mold section to said first mold section to substantially enclose said open cavity and thereby form a substantially closed cavity between said first and second mold sections, said portion of said fern being enclosed within said closed cavity between said first and second aluminum foil sheets;

g. pressure-injecting a resin into said closed cavity through an opening formed in an upper one of said first and second mold sections and in one of said first and second aluminum foil sheets for permeating said portion of said fern;

h. heating said resin within said closed cavity to a predetermined temperature to facilitate curing of said resin, whereby said portion of said fern is impregnated with said resin to produce a molded resin form;

i. cooling said molded resin form within said closed cavity with room temperature air, said step of cooling said molded resin form including the step of drying said molded resin form;

j. removing said molded resin form from within said closed cavity, said step of removing including the step of separating said molded resin form from said first and second aluminum foil sheets;

k. machining said molded resin form into a shaped resin form having an outer surface of predetermined contour;

l. smoothing said shaped resin form; and, m. polishing said shaped resin form, said portion of said fern forming a natural pattern on said shaped resin form outer surface.

2. The method as recited in claim 1 where said step of providing a portion of a fern includes the step of providing a stem portion of said fern.

3. The method as recited in claim 2 where said fern is a *Sphaeropteris lepifera*.

4. The method as recited in claim 1 where said step of providing a portion of a fern includes the step of providing a root portion of said fern.

5. The method as recited in claim 4 where said fern is a *Sphaeropteris lepifera*.

6. The method as recited in claim 1 where said step of securing said second mold section to said first mold section is preceded by the step of providing an auxiliary mold member and inserting said auxiliary mold member into a hollow portion of said portion of said fern.

7. The method as recited in claim 6 where said step of providing an auxiliary mold member is preceded by the step of overlaying said auxiliary mold member with a third aluminum foil sheet.

* * * * *